(No Model.)
J. A. BARRETT.
ELECTRIC CIRCUIT AND CABLE.
No. 482,152. Patented Sept. 6, 1892.
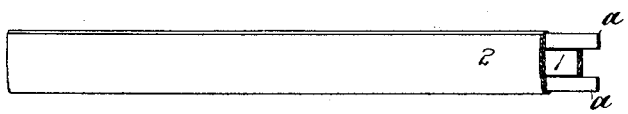 
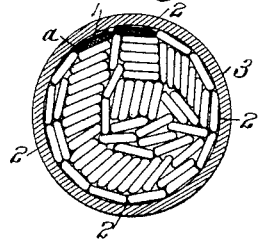
Attest:
Geo H Bott
C. J. Sawyer
Inventor:
John A Barrett
by
Phelps Munson & Phelps
Attys.

UNITED STATES PATENT OFFICE.

JOHN A. BARRETT, OF BROOKLYN, NEW YORK, ASSIGNOR TO THE STANDARD UNDERGROUND CABLE COMPANY, OF PITTSBURG, PENNSYLVANIA.

ELECTRIC CIRCUIT AND CABLE.

SPECIFICATION forming part of Letters Patent No. 482,152, dated September 6, 1892.

Application filed August 28, 1891. Serial No. 403,963. (No model.)

*To all whom it may concern:*

Be it known that I, JOHN A. BARRETT, a citizen of the United States, residing at Brooklyn, county of Kings, and State of New York, have invented certain new and useful Improvements in Electric Circuits and Cables, fully described and represented in the following specification and the accompanying drawings, forming a part of the same.

This invention relates to electric circuits composed of a pair of conductors forming the two branches of the circuit and to electric cables composed of a group of insulated conductors forming a plurality of such circuits, its object being to provide improved circuit and cable constructions by which the induction of the conductors and retardation resulting therefrom shall be reduced. In conductors of that class in which vibratory or alternating currents are employed, and especially in telephone work, the retardation caused by the induction of the conductors is an important element, and constant effort has been made and many arrangements and constructions devised to reduce this retardation. It is well known that the induction tending to produce retardation is of greater effect between the conductors forming a circuit than between conductors of different circuits and that the retardation due to induction between conductors varies with the surface exposure. I am able, therefore, to provide an improved construction of a group of circuits by forming the conductors with such a distribution of material that the surface exposure between conductors of the same circuit is decreased, although for the conduction of the required quantity of current the surface exposure between conductors of different circuits may be increased. I attain the desired result of the reduction of the induction and retardation in electric circuits and groups of circuits of the class referred to by employing conductors consisting of flat ribbons of metal, these conductors being arranged edgewise with relation to each other, so that the surface exposure is reduced, while a sufficient cross-area of the conductor to carry the current is secured. The circuits may be insulated or uninsulated and used in lines of any character, and the conductors forming the circuits may be held with their edges toward each other by any suitable means. In making a cable the circuits and cable may be constructed in any suitable manner, the circuits being formed independently and grouped to form the cable or the different conductors grouped in the cable as the circuits are formed. In making a cable, however, it is found convenient in practice to form each circuit in a single strand, these strands then being grouped to form the cable; and my invention consists in part of a single-strand circuit consisting of a pair of flat insulated conductors held in position edgewise with relation to each other.

In the accompanying drawings, forming a part of this specification, I have shown my invention as embodied in a single-strand circuit and cable composed of a number of such circuits.

Figure 1 is a broken plan view of my improved circuit. Fig. 2 is a cross-section of the same, and Fig. 3 is a cross-section of a cable of my improved construction.

*a* are the conductors, which are shown as arranged side by side with their edges toward each other and separated the desired distance to secure the proper distribution of space in the cable by means of the strip 1 of paper or any other suitable material. The circuit is completed by a wrapper of paper or other suitable material 2, wrapped about the conductors straight and having its overlapping edges secured to each other and to the central strip 1 by gumming.

In Fig. 3 the circuits are shown as grouped to form the cable and inclosed within an ordinary lead sheath 3.

It will be understood that the construction shown is only one of many forms of single-strand circuits and cables in which my invention may be embodied and that the invention is not to be limited to any particular construction or means by which the conductors are secured in the desired position in the cable, nor to the grouping of the conductors in single-strand circuits prior to the formation of the cable.

While it will be seen that the use of the flat conductor enables me to form a flat circuit of small thickness, so that a very large number may be packed within the limited cross-area of a cable, it will be understood that my invention is not thus limited, but that the circuit may be made of any other form without departing from my invention.

The circuit of the special form and construction of insulation shown forms no part of the present invention and is claimed in my application, Serial No. 399,798.

What I claim is—

1. An anti-induction circuit consisting of a pair of flat conductors arranged edgewise with relation to each other, substantially as described.

2. A single-strand anti-induction electric circuit consisting of a pair of flat conductors held in position edgewise with relation to each other, substantially as described.

3. A single-strand anti-induction electric circuit consisting of a pair of flat conductors held in position edgewise with relation to each other by insulating material between and about the conductors, substantially as described.

4. An electric cable consisting of a group of flat conductors forming a plurality of anti-induction circuits and arranged with the conductors of the same circuits edgewise with relation to each other, substantially as described.

5. An electric cable consisting of a plurality of single-strand anti-induction circuits, each circuit consisting of a pair of flat insulated conductors held in position edgewise with relation to each other, substantially as described.

6. A group of flat conductors forming a plurality of anti-induction circuits and arranged with the conductors of the same circuits edgewise with relation to each other, substantially as described.

In testimony whereof I have hereunto set my hand in the presence of two subscribing witnesses.

JOHN A. BARRETT.

Witnesses:
JEROME B. BROMLEY,
W. C. MOULTON.